United States Patent
Tsunashima (10) Patent No.: US 8,433,139 B2
(45) Date of Patent: Apr. 30, 2013

(54) IMAGE PROCESSING APPARATUS, IMAGE PROCESSING METHOD AND PROGRAM FOR SEGMENTATION BASED ON A DEGREE OF DISPERSION OF PIXELS WITH A SAME CHARACTERISTIC QUALITY

(75) Inventor: Nobuhiro Tsunashima, Kanagawa (JP)

(73) Assignee: Sony Corporation, Tokyo (JP)

( * ) Notice: Subject to any disclaimer, the term of this patent is extended or adjusted under 35 U.S.C. 154(b) by 288 days.

(21) Appl. No.: 12/779,105

(22) Filed: May 13, 2010

(65) Prior Publication Data
US 2010/0296743 A1 Nov. 25, 2010

(30) Foreign Application Priority Data
May 21, 2009 (JP) .................. P2009-123412

(51) Int. Cl.
*G06K 9/66* (2006.01)
(52) U.S. Cl.
USPC .......................................... 382/195; 382/228
(58) Field of Classification Search .................. None
See application file for complete search history.

(56) References Cited

U.S. PATENT DOCUMENTS

| | | | |
|---|---|---|---|
| 6,532,301 B1* | 3/2003 | Krumm et al. ................. | 382/170 |
| 6,847,733 B2* | 1/2005 | Savakis et al. ................ | 382/225 |
| 7,280,673 B2* | 10/2007 | Buehler et al. ................. | 382/103 |
| 8,036,468 B2* | 10/2011 | Chrysanthakopoulos .... | 382/225 |
| 8,068,701 B2* | 11/2011 | Ujisato et al. ................. | 382/305 |
| 2002/0030739 A1* | 3/2002 | Nagaya et al. ................ | 348/143 |
| 2008/0056619 A1* | 3/2008 | Ujisato et al. ................. | 382/305 |

FOREIGN PATENT DOCUMENTS

JP   2008 46769   2/2008

OTHER PUBLICATIONS

Bhaskar et al., "Automatic Object Detection Based on Adaptive Background Subtraction Using Symmetric Alpha Stable Distribution," IET Seminar on Target Tracking and Data Fusion: Algorithms and Applications, 2008, pp. 197-203.*

* cited by examiner

*Primary Examiner* — Barry Drennan
*Assistant Examiner* — Andrew Moyer
(74) *Attorney, Agent, or Firm* — Frommer Lawrence & Haug LLP; William S. Frommer; Ellen Marcie Emas (57) ABSTRACT

An image processing apparatus is provided which includes a characteristic quantity calculation unit that calculates a characteristic quantity for each pixel of image data from the image data, a tightness determination unit that determines tightness indicating a degree of dispersion of pixels in image data for tightness determination by extracting the pixels having a same characteristic quantity by using the characteristic quantity and generating the image data for tightness determination composed of the pixels having the same characteristic quantity, and a pixel set calculation unit that calculates a set of the pixels from the pixels in the image data for tightness determination in accordance with a determination of the tightness.

6 Claims, 10 Drawing Sheets

| 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 1 | 1 | 0 | 0 | 0 | 0 | 0 |
| 0 | 0 | 0 | 0 | 0 | 0 | 0 | 0 | 0 | 0 | 0 | 1 | 1 | 0 | 0 | 0 | 0 | 0 |
| 0 | 0 | 0 | 0 | 0 | 0 | 0 | 0 | 0 | 0 | 0 | 1 | 1 | 0 | 0 | 0 | 0 | 0 |
| 0 | 0 | 0 | 0 | 0 | 0 | 1 | 1 | 1 | 1 | 1 | 1 | 1 | 1 | 0 | 0 | 0 | 0 |
| 0 | 0 | 0 | 0 | 0 | 0 | 1 | 1 | 1 | 1 | 1 | 1 | 1 | 1 | 0 | 0 | 0 | 0 |
| 0 | 1 | 1 | 1 | 1 | 1 | 1 | 1 | 1 | 1 | 1 | 1 | 1 | 1 | 1 | 1 | 1 | 0 |
| 0 | 0 | 1 | 1 | 1 | 1 | 1 | 1 | 1 | 1 | 1 | 1 | 1 | 1 | 1 | 1 | 0 | 0 |
| 0 | 0 | 0 | 0 | 1 | 1 | 1 | 1 | 1 | 1 | 1 | 1 | 1 | 1 | 1 | 0 | 0 | 0 |
| 0 | 0 | 0 | 0 | 0 | 1 | 1 | 1 | 1 | 1 | 1 | 1 | 1 | 1 | 1 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |

IMAGE PROCESSING APPARATUS, IMAGE PROCESSING METHOD AND PROGRAM FOR SEGMENTATION BASED ON A DEGREE OF DISPERSION OF PIXELS WITH A SAME CHARACTERISTIC QUALITY

BACKGROUND OF THE INVENTION

1. Field of the Invention

The present invention relates to an image processing apparatus, an image processing method, and a program.

2. Description of the Related Art

To monitor or track an object such as a person or vehicle contained in an image photographed by an image photographing means such as a surveillance camera (ITV camera), it is first necessary for an object in an image to be detected. For example, a system of a monitoring apparatus using a surveillance camera is constructed in which a place to be monitored such as an off-limits area is photographed by the camera, presence/absence of any object contained in the image is detected, and raises an alarm when an object (suspicious object) enters the monitoring place being photographed.

When an object in the image makes an entry, brightness of the object area, that is, a luminance value of the object area in the image changes. Thus, an object can be detected by detecting an area where a difference in luminance value in the image arises as a differential area. However, if the monitoring place is the sea, a desert, grassland or the like, such a technique based on a change in luminance value over time poses an issue that other objects than detection objects may erroneously be detected because water, sand, and grass other than ships, persons, and vehicles to be detected also move.

Japanese Patent Application Laid-Open No. 2008-46769 is a technology that stably monitors for entries of suspicious-looking persons or objects from image data obtained from a surveillance camera intended for monitoring a place like the sea, a desert, or grassland where fluctuations are caused in a photographing screen mainly by natural phenomena.

SUMMARY OF THE INVENTION

The technology of Japanese Patent Application Laid-Open No. 2008-46769 is a kind of texture analysis method using a simultaneous occurrence probability matrix of image. A plurality of combinations of luminance values of a focused pixel and surrounding pixels thereof is generated to calculate a frequency of combinations of luminance values. Then, an object is detected by determining an area composed of pixels of less frequent combinations of luminance values in a whole image as a foreign object.

However, according to the technology of Japanese Patent Application Laid-Open No. 2008-46769, only threshold processing on a simultaneous occurrence probability matrix created from image data is used. If, for example, the frequency of combinations of certain luminance values exceeds a threshold, pixels of combinations of the luminance values are determined to be a background and if, on the other hand, the threshold is not exceeded, pixels thereof are determined to be an object entering the image. Thus, if areas having the same pattern arise close together locally, the frequency of combinations of luminance values of the areas will exceed a predetermined threshold set in advance. Therefore, detection omission of objects may occur.

If the horizon, the skyline, a boundary portion of a boundary between a cloud and the sky is contained in an image on the screen, these boundary portions are very narrow areas in the whole image. Thus, combinations of luminance values in which one is from the sea and the other from the sky in the whole image are very rare. As a result, because threshold processing is simply performed according to the technology of Japanese Patent Application Laid-Open No. 2008-46769, for example, a horizon portion is determined as a foreign object, leading to erroneous detection of objects.

In light of the foregoing, it is desirable to provide a novel and improved image processing apparatus capable of reducing detection omission and erroneous detection of objects to be detected when an object making an entry into the image is detected from image data, an image processing method, and a program.

According to an embodiment of the present invention, there is provided an image processing apparatus, including a characteristic quantity calculation unit that calculates a characteristic quantity for each pixel of image data from the image data, a tightness determination unit that determines tightness indicating a degree of dispersion of pixels in image data for tightness determination by extracting the pixels having a same characteristic quantity by using the characteristic quantity and generating the image data for tightness determination composed of the pixels having the same characteristic quantity, and a pixel set calculation unit that calculates a set of the pixels from the pixels in the image data for tightness determination in accordance with a determination of the tightness.

The characteristic quantity may be a simultaneous occurrence probability matrix based on a frequency of combinations of luminance values of two different pixels.

The tightness determination unit may calculate variances of positions of the pixels in the image data for tightness determination and determines whether the pixels in the image data for tightness determination are distributed throughout the image data or crowded only in a portion of the image data based on the variances of positions, and if the pixels in the image data for tightness determination are determined to be crowded in the portion of the image data, the pixel set calculation unit may calculate a set of the pixels in the image data for tightness determination.

The tightness determination unit may calculate the tightness throughout an image of the pixels in the whole image data for tightness determination and local tightness of the pixels in the image data for tightness determination and may compare the tightness throughout the image and the local tightness to determine whether the pixels in the image data for tightness determination are distributed throughout the image data or crowded in a portion of the image data, and if the pixels in the image data for tightness determination are determined to be crowded only in the portion of the image data, the pixel set calculation unit may calculate a set of the pixels in the image data for tightness determination.

If the frequency of combinations of luminance values of two different pixels is between two thresholds, the tightness determination unit may determine the tightness indicating the degree of dispersion of the pixels in the image data for tightness determination.

According to an embodiment of the present invention, there is provided an image processing method including the steps of calculating a characteristic quantity for each pixel of image data from the image data by a characteristic quantity calculation unit, determining tightness indicating a degree of dispersion of pixels in image data for tightness determination by extracting the pixels having a same characteristic quantity by using the characteristic quantity and generating the image data for tightness determination composed of the pixels having the same characteristic quantity by a tightness determination unit, and calculating a set of the pixels from the pixels in the image data for tightness determination in accordance with a determination of the tightness by a pixel set calculation unit.

According to an embodiment of the present invention, there is provided a program for causing a computer to execute a procedure for calculating a characteristic quantity for each pixel of image data from the image data by a characteristic quantity calculation unit, a procedure for determining tightness indicating a degree of dispersion of pixels in image data for tightness determination by extracting the pixels having a same characteristic quantity by using the characteristic quantity and generating the image data for tightness determination composed of the pixels having the same characteristic quantity by a tightness determination unit, and a procedure for calculating a set of the pixels from the pixels in the image data for tightness determination in accordance with a determination of the tightness by a pixel set calculation unit.

According to the embodiments of the present invention described above, detection omission and erroneous detection of objects to be detected can be reduced when an object making an entry into the image is detected from image data.

DETAILED DESCRIPTION OF THE EMBODIMENT(S)

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The present invention will be described in the order below:
1. First embodiment
2. Second embodiment <1. First Embodiment>
[Configuration of the Image Processing Apparatus 100]

Figure 1:
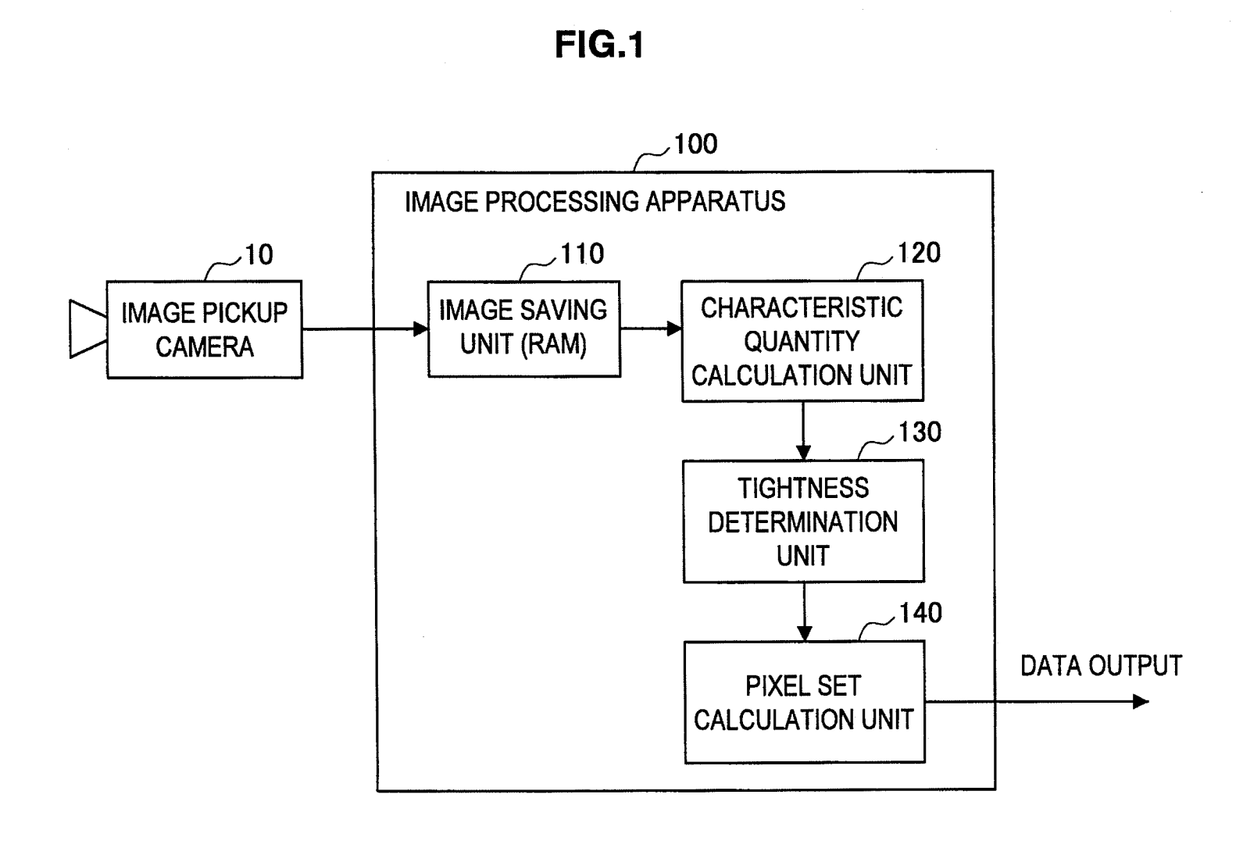
FIG. 1 is a block diagram showing an image processing apparatus 100 according to a first embodiment of the present invention.

First, the configuration of the image processing apparatus 100 according to the first embodiment of the present invention will be described. FIG. 1 is a block diagram showing the image processing apparatus 100 according to the present embodiment.

The image processing apparatus 100 detects any object (for example, a suspicious-looking object) entering images in a monitoring place by receiving image data from an image pickup camera 10. The image processing apparatus 100 also outputs a binary signal (alarm) to indicate presence/absence of object detection or an image signal after predetermined processing being performed. The output image signal is transmitted to, for example, a large-capacity storage device such as an HDD or another host apparatus via a communication line.

The image pickup camera 10 (image input means) has, for example, a CCD image pickup device or CMOS image pickup device and outputs an image signal. The image pickup camera 10 is a surveillance camera to monitor a place where fluctuations are caused in a photographing screen by natural phenomena such as the sea, a desert, and grassland.

The image processing apparatus 100 is installed together with the image pickup camera 10. If, for example, the sea is monitored, the image pickup camera 10 and the image processing apparatus 100 are installed on the coast.

The image pickup camera 10 may include a drive mechanism such as a motor (not shown) to be driven for reciprocation to broaden a monitoring area. The image pickup camera 10 may have high zoom power set thereto to catch a remote object. In such a case, the photographing angle (angle of view) of the image pickup camera 10 becomes narrower, which makes necessary for the image pickup camera 10 to reciprocate. When the image pickup camera 10 reciprocates, the method of detecting an entering object based on differences between pieces of image data by comparing the displaying still image and the last displayed still image is not effective. According to the present embodiment, on the other hand, even if the image pickup camera 10 reciprocates, an entering object can suitably be detected.

The image processing apparatus 100 is mainly composed of a microcomputer. Though not shown, a microcomputer includes a CPU, ROM, and RAM. Then, the microcomputer performs predetermined processing using image data obtained from the image pickup camera 10. The microcomputer also outputs a predetermined signal (a binary signal, image signal or the like) via an output interface.

The image processing apparatus 100 includes, for example, an image saving unit 110, a characteristic quantity calculation unit 120, a tightness determination unit 130, and a pixel set calculation unit 140. Excluding the image saving unit 110, which is actually a RAM, each unit of the image processing apparatus 100 is a software program executed on a microcomputer. The software is stored in the ROM.

The image saving unit 110 holds an image signal obtained from the image pickup camera 10 temporarily as still images.

The characteristic quantity calculation unit 120 reads out still image data inside the image saving unit 110 and creates characteristic quantity data based on the still image data. The characteristic quantity calculation unit 120 calculates a characteristic quantity such as a simultaneous occurrence probability and sends the characteristic quantity to the tightness determination unit 130. Characteristic quantity data is created by array data based on a simultaneous occurrence probability matrix or the like which will be described later.

The tightness determination unit 130 creates bitmap data identifying an object in still image data based on array data created by the characteristic quantity calculation unit 120. The tightness determination unit 130 calculates a numeric value indicating locality or the degree of dispersion such as a variance to determine whether each pixel of an image is an object or background.

The pixel set calculation unit 140 calculates a pixel set after receiving pixel information determined to be an object. The pixel set calculation unit 140 calculates a total area of an image portion occupied in still image data and assumed to be an object and center coordinates thereof from the bitmap data created by the tightness determination unit 130. The pixel set calculation unit 140 sends the size and position of the determined pixel set to a recording apparatus or alarm apparatus.

[Operation of the Image Processing Apparatus 100]

Figure 2:
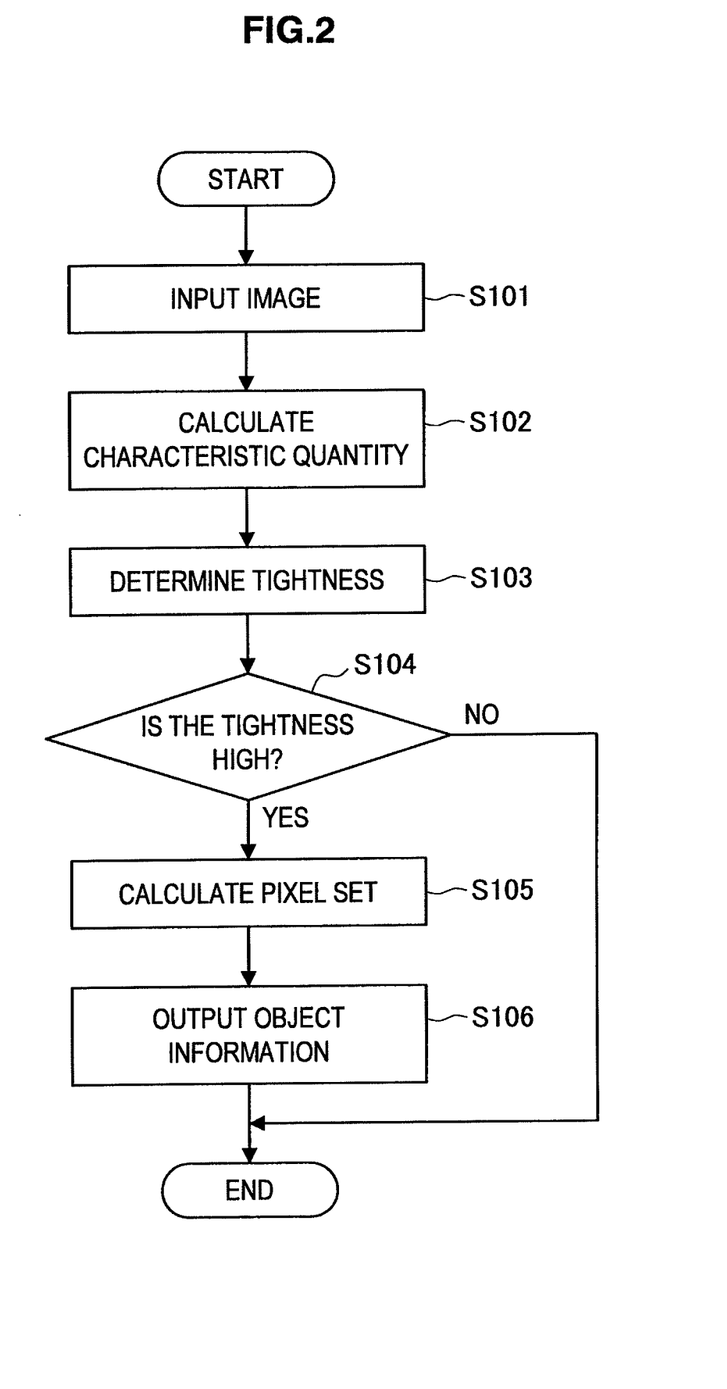
FIG. 2 is a flow chart showing an operation of the image processing apparatus 100 according to the embodiment.

Next, the operation of the image processing apparatus 100 according to the present embodiment will be described. FIG. 2 is a flow chart showing the operation of the image processing apparatus 100 according to the present embodiment will be described.

First, image data is input from the image pickup camera 10 (step S101). Next, the image data is input into the characteristic quantity calculation unit 120 after temporarily being saved in the image saving unit 110. Then, the characteristic quantity calculation unit 120 calculates a characteristic quantity of a whole image of the input image or an area of a portion of the image specified in advance (step S102).

Figure 3A:
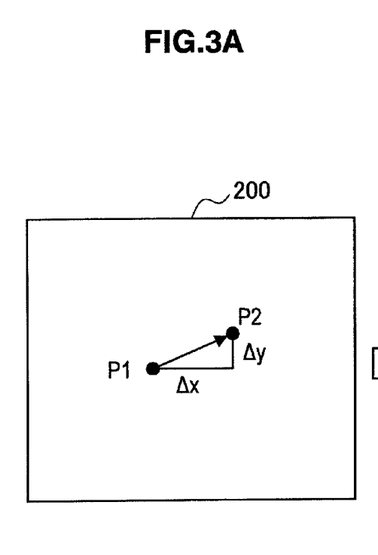
FIG. 3A is an explanatory view showing an input image 200.

In the present embodiment, for example, a simultaneous occurrence probability matrix is used as a characteristic quantity. To calculate a simultaneous occurrence probability matrix, as shown in FIG. 3A, another pixel P2 that is apart from a focused pixel P1 in the image 200 by Dx and Dy is first selected. FIG. 3A is an explanatory view showing the input image 200.

Figure 3B:
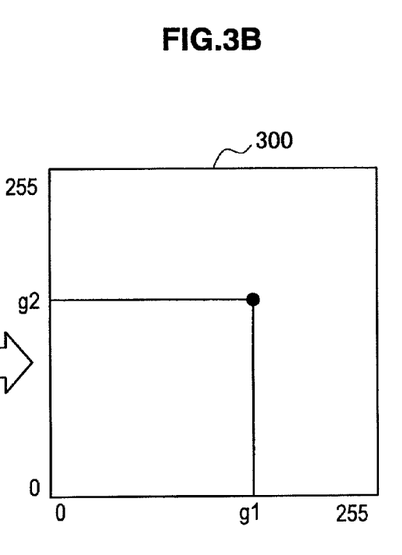
FIG. 3B is an explanatory view showing a simultaneous occurrence probability matrix.

It is assumed that the luminance value of the focused pixel P1 in the image is g1 and that of the other pixel P2 is g2. If the luminance level of an image is an 8-bit value (0 to 255), g1 and g2 can be represented as a point in a two-dimensional space with the vertical axis and the horizontal axis each representing the luminance level of an image as shown in FIG. 3B. This two-dimensional space is called a simultaneous occurrence probability matrix. FIG. 3B is an explanatory view illustrating a simultaneous occurrence probability matrix.

Figure 4:
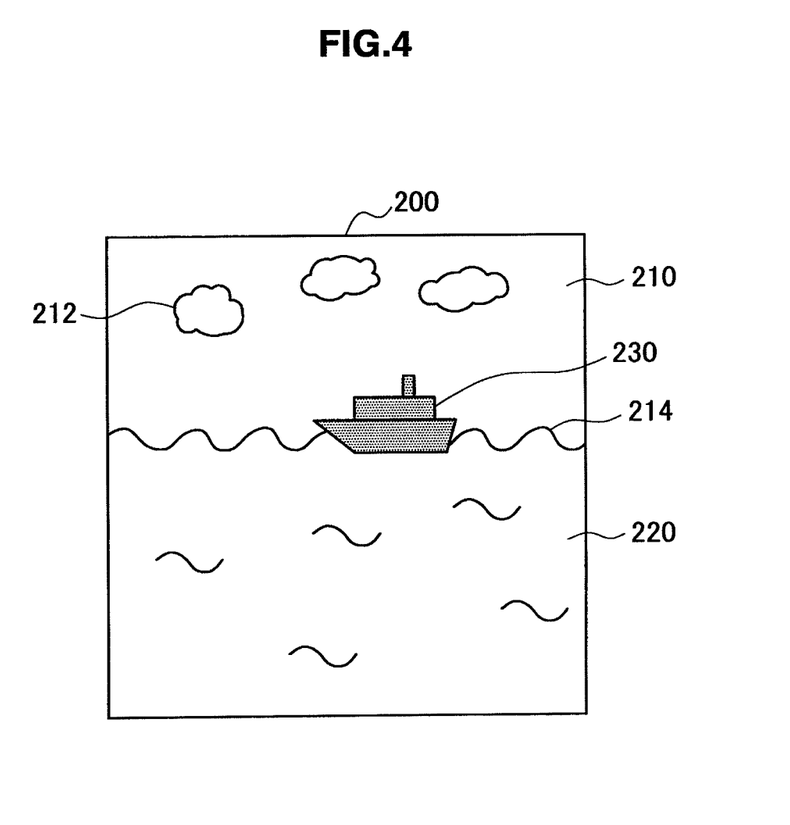
FIG. 4 is an explanatory view showing the image data 200 stored inside an image saving unit 110 (RAM)

The simultaneous occurrence probability matrix indicates an occurrence probability of the combination of any two luminance values in the image 200. Consider, for example, a scene as shown in FIG. 4 with a ship 230. FIG. 4 is an explanatory view showing the image data 200 stored inside the image saving unit 110 (RAM). The image data 200 in FIG. 4 is input image bitmap data and is stored in an input image bitmap data saving area of the image saving unit 110 (RAM). The input image bitmap data is still image data photographed by the image pickup camera 10. Each pixel has data representing luminance of, for example, 0 to 255. The image in FIG. 4 has a sky 210, a sea 220, and the ship 230, which is an object (suspicious-looking object) entering an image of the monitoring place photographed therein.

Figure 5:
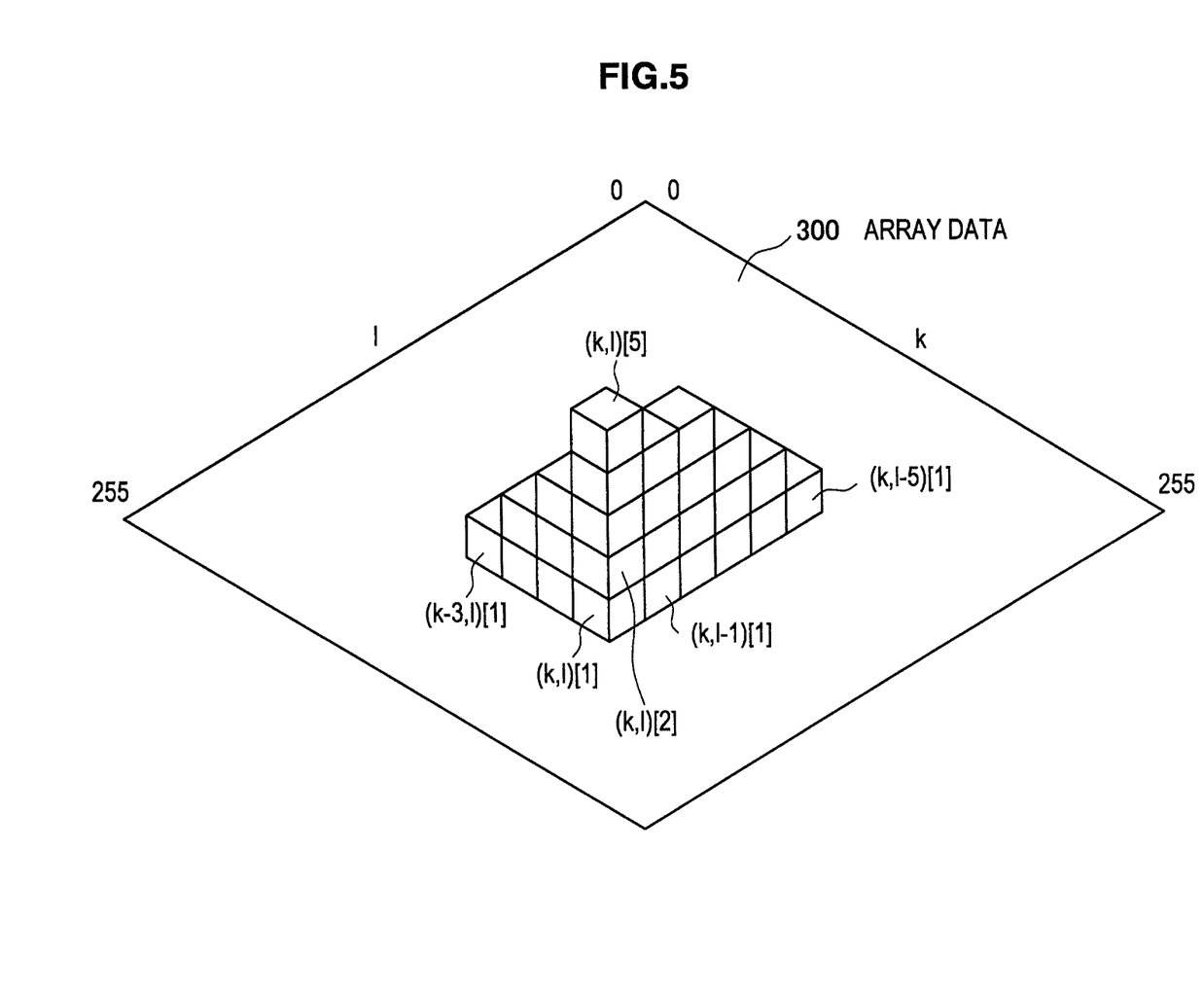
FIG. 5 is an explanatory view schematically showing array data 300.

FIG. 5 is an explanatory view schematically showing the array data 300. The array data is stored in an array data area of the image saving unit 110 (RAM). Though the image saving unit 110 (RAM) does not actually have an internal shape as shown in FIG. 5, the shape shown in FIG. 5 is virtually assumed by a software program and shown.

In FIG. 5, the array data 300 is based on a simultaneous occurrence probability matrix. A simultaneous occurrence probability matrix is a square matrix in which a height k and a width l each have 256 elements with 0 to 25. The height k and the width l each correspond to luminance of image data. Cubes are piled up on each element of the matrix.

(k, l) [1] in FIG. 5 is the first array element of array data composed of matrix elements of the k-th row and the l-th column. Similarly, (k, l) [2] is the second array element of array data composed of matrix elements of the k-th row and the l-th column. The array data (k, l) has five array elements and thus, up to the element (k, l) [5] is present. (k, l–1) [1] in FIG. 5 is the first array element of array data composed of matrix elements of the k-th row and the (l–1)-th column. Similarly, (k, l–5) [1] is the first array element of array data composed of matrix elements of the k-th row and the (l–5)-th column. Similarly, (k–3, 1) [1] is the first array element of array data composed of matrix elements of the (k–3)-th row and the l-th column.

If, as shown in FIG. 3, the luminance value of the focused pixel P1 in the image 200 is g1 and that of the other pixel P2 is g2, 1 is noted for a point corresponding to g1 and g2 of the simultaneous occurrence probability matrix. By performing this processing for any pixels in the image, as shown in FIG. 5, a simultaneous occurrence probability matrix for the whole image or an area of a portion of the image specified in advance can be determined.

For example, the background portion showing a wide area in the input image bitmap data 200 shown in FIG. 4 has elements concentrated at a location in the simultaneous occurrence probability matrix because combinations of the same luminance values occur frequently. In FIG. 5, for example, image data corresponding to a portion of, for example, the sky 210 (or the sea 220), which is a portion of the input image bitmap data 200 in FIG. 4, corresponds to piled-up cubes of the array data 300. In the image 200 in FIG. 4, the sky 210 (or the sea 220) occupies a large portion thereof and therefore, occurrence probabilities of combinations of luminance values in a portion of the sky 210 (or the sea 220) increase in a simultaneous occurrence probability matrix.

On the other hand, occurrence probabilities of combinations of luminance values in a portion of the ship 230 remain low. When waves of the sea 220 run high, occurrence probabilities become higher if luminance values of the waves appear repeatedly in the image. Thus, there is no possibility of erroneously detecting waves as an entering object in the image.

Next, the distribution of each occurrence probability of a created simultaneous occurrence probability matrix in an image will be considered. More specifically, pixels having a combination (g1, g2) of luminance values showing some occurrence probability are plotted on an image. If, for example, as shown in FIG. 7, pixels having combinations of luminance values of a ship portion are plotted, as shown in FIG. 6 or FIG. 7B, an area of a ship 430 is reproduced in an image 402.

Figure 6:
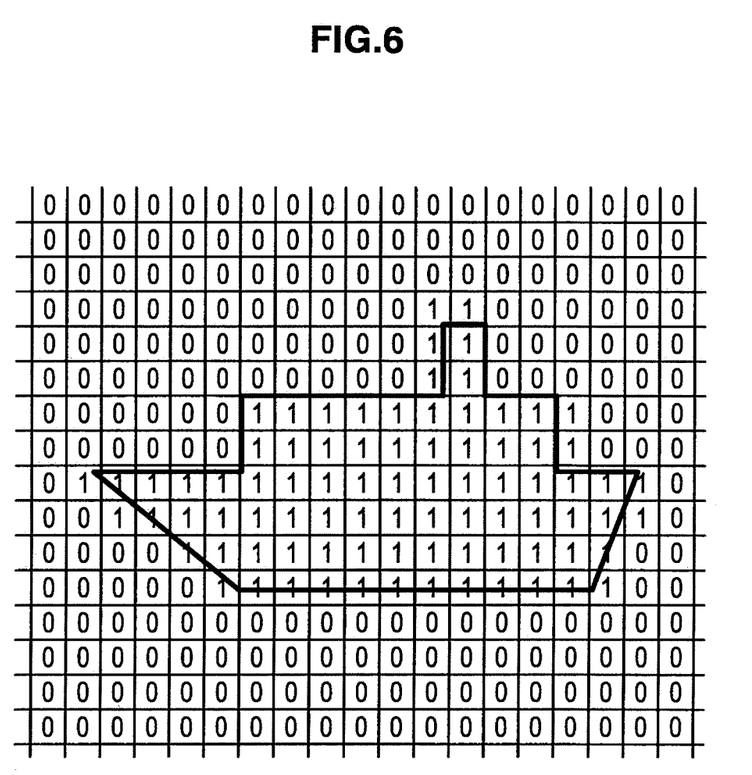
FIG. 6 is an enlargement of a portion of image flag bitmap data.
Figure 7A:
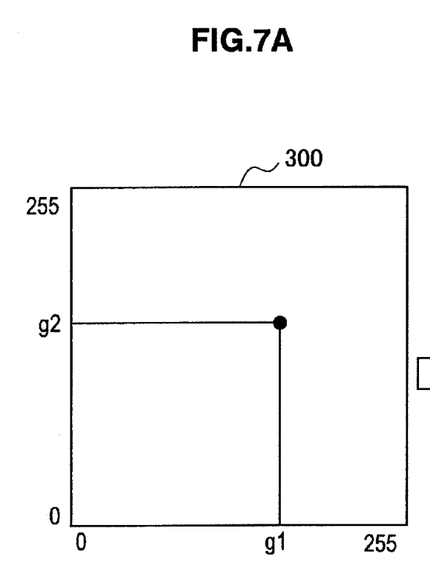
FIG. 7A is an explanatory view showing the simultaneous occurrence probability matrix 300.
Figure 7B:
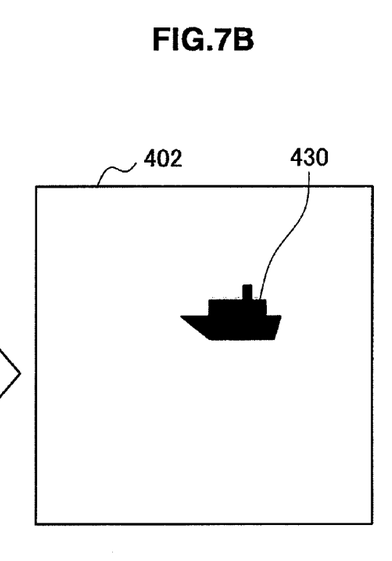
FIG. 7B is an explanatory view showing image flag bitmap data 402.

FIG. 6 is an enlargement of a portion of image flag bitmap data. Each pixel has a 1-bit value. The bit value of each pixel becomes 1 if the pixel has the combination (g1, g2) of luminance values showing some occurrence probability and the bit value becomes 0 if the pixel does not have the combination (g1, g2) of luminance values showing some occurrence probability. FIG. 7A is an explanatory view showing the simultaneous occurrence probability matrix 300. FIG. 7B is an explanatory view showing the image flag bitmap data 402.

Figure 8A:
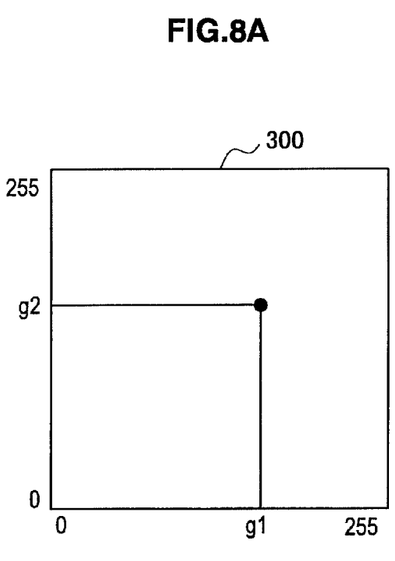
FIG. 8A is an explanatory view showing the simultaneous occurrence probability matrix 300.
Figure 8B:
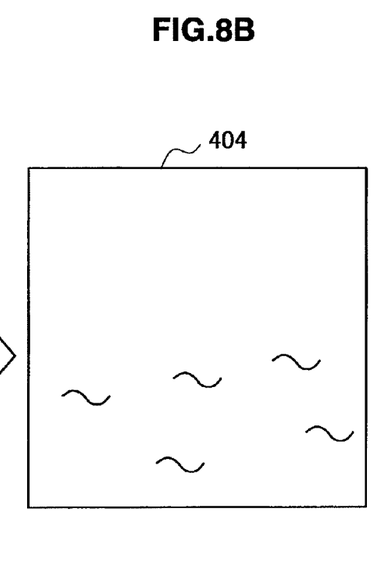
FIG. 8B is an explanatory view showing image flag bitmap data 402.

On the other hand, if, as shown in FIG. 8, pixels having combinations of luminance values of a wave portion are plotted, as shown in FIG. 8B, a wave portion is reproduced in an image 404. FIG. 8A is an explanatory view showing the simultaneous occurrence probability matrix 300. FIG. 8B is an explanatory view showing the image flag bitmap data 404. Since neither the ship nor the wave actually has a uniform texture, only a portion of the ship and the wave is actually reproduced in FIG. 7B and FIG. 8B respectively.

Next, after the characteristic quantity, for example, a simultaneous occurrence probability matrix being determined, locality of a plotted image is calculated to determine tightness (step S103). If plotted pixels are distributed throughout the image or in a wide range of the image, these pixels are considered to be a portion of an image pattern of the image. On the other hand, if plotted pixels are crowded only in a portion of the image, this can be considered to be an object to be detected that enters the image.

Thus, locality of a plotted image is first calculated.

The locality here referees to a numeric index indicating whether plotted pixels are crowded only in a portion of the image and thus localized or distributed throughout the image. The numeric index includes, for example, a "variance of position" of plotted pixels. If plotted pixels are crowded only in a portion of the image, the variance decreases. Conversely, if plotted pixels are distributed throughout the image, the variance increases.

The variance (V) is determined by the formula below:

$$xa(i,j) = (\Sigma_{x,y}(1-\text{sign}(|g1(x,y)-i|+|g2(x,y)-j|)) \cdot x/C(i,j)$$

$$ya(i,j) = (\Sigma_{x,y}(1-\text{sign}(|g1(x,y)-i|+|g2(x,y)-j|)) \cdot y/C(i,j)$$

$$V(i,j) = \Sigma_{x,y}(1-\text{sign}(|g1(x,y)-i|+|g2(x,y)-j|)) \cdot \\ ((x-xa(i,j)) \cdot ((x-xa(i,j)) + (y-ya(i,j) \cdot ((y-ya(i,j)))$$

where i and j are two-dimensional coordinates of a simultaneous occurrence probability matrix. C is the value of the simultaneous occurrence probability matrix. x and y denote coordinates of an input image. g1(x, y) and g2(x, y) are luminance values of the input image for which the above occurrence probabilities are determined. xa and ya are position average values of x and y respectively.

If, as a result of using the above formula, the variance (V) is small, the plotted image can be considered to be an object because tightness is high only in a portion of the image and if the variance (V) is large, the plotted image can be considered to be a background because tightness is low.

Such processing is performed for two-dimensional coordinates i and j of all simultaneous occurrence probability matrices. Then, if tightness is determined to be high for combinations of certain luminance values (step S104), the plotted image is determined to be an object entering an image. Then, all pixels having combinations of the luminance values are plotted on the image to calculate a pixel set using a method of labeling or the like (step S105). The pixel set determined here is set as an object area and information such as the position and size thereof is output as object information (step S106). If a determination is made at step S104 that tightness is low, the plotted image is determined to be a background and processing is terminated under the assumption that no object has been detected.

According to the "numeric index of locality" using the "variance of position" of plotted pixels described above, pixels having combinations of luminance values whose tightness is high only in a portion of the image are determined to be an object entering image. As a result, detection omission of object can be prevented.

In addition to an effect of preventing detection omission, the present embodiment also has an effect of preventing erroneous detection of a horizon line portion. When a simultaneous occurrence probability matrix is determined, the horizon line is a very narrow portion as an area and combinations of luminance values of the sea and the sky are considered to be very rare in the whole image. Thus, if threshold processing is simply performed like a technology in the past, erroneous detection may occur in a horizon line portion. However, if a tightness determination is made based on the variance, as described above, tightness of a portion of the horizon line that extends horizontally and the variance thereof increases. Therefore, the portion of the horizon line that extends horizontally will not be determined to be an object. As a result, erroneous detection of a portion of the horizon line that extends horizontally can be reduced. A similar effect can also be accomplished, in addition to the horizon line, in an area having long boundary lines such as a cloud to reduce erroneous detection.

Incidentally, the "numeric index of locality" using the "variance of position" of the above plotted pixels works effectively when only one object is present in an image. However, if there are two or more objects in an image, the variance thereof increases. Thus, like a technology in the past, detection omission may occur.

Thus, when tightness is determined at step S103, another method that is different from the above method to calculate locality of a plotted image will be described. That is, the method of calculating "another numeric index" representing locality will be described.

First, tightness (Ma) of the whole image is determined by the formula below:

$$Ma(i,j) = C(i,j)/N$$

where i and j are two-dimensional coordinates of a simultaneous occurrence probability matrix. C is the value of the simultaneous occurrence probability matrix and N is the number of pixels of an input image.

Next, local tightness (M1) is determined. Various methods to determine tightness are known and here, the weighting method based on distance will be described.

$$M1(x,y) = \Sigma_{m,n}(1-\text{sign}(|g1-i|+|g2-j|)) \cdot g(x-m,y-n)$$

where x and y are coordinates where tightness on the input image is to be determined and g1 and g2 are luminance values of an image for which the above occurrence probabilities are determined.

This is calculated for any m and n and then, a sum thereof is determined. m and n are variables denoting coordinates of the width and the height of an image respectively. g( ) is a smoothing function like the Gaussian function. That is, this formula assigns weights to plotted pixels for smoothing and calculates accumulated values for each of pixels.

Figure 9A:
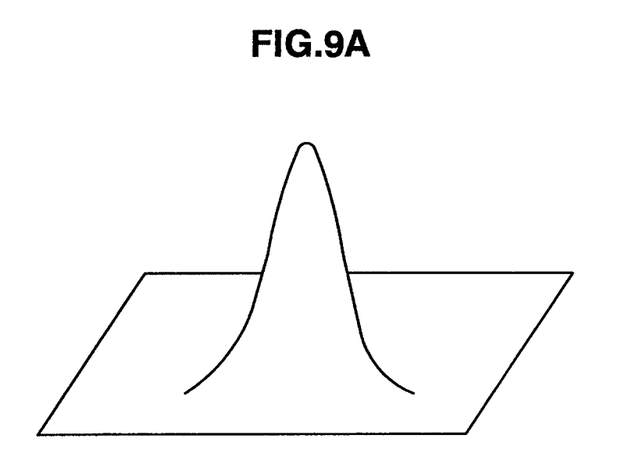
FIG. 9 is an explanatory view schematically showing smoothed images.
Figure 9B:
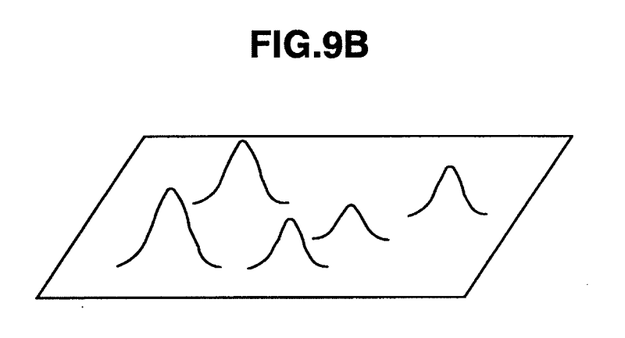

If the above formula is used, as shown in FIG. 9, a high distribution (FIG. 9A) is shown if pixels are crowded and a low high distribution (FIG. 9B) is shown if pixels are distributed. FIG. 9 is an explanatory view schematically showing smoothed images.

Ma(i, j) is tightness of a whole image and M1(x, y) is tightness of each pixel and thus, by comparing these two values, if the difference thereof is small, the pixel can be considered to be a background and if the difference is large, the pixel can be considered to be an object. For example, the ratio (S) of the two values is used as the method of comparison.

$$S = M1(x,y)/Ma(i,j)$$

If locality is high, the value of M1 increases and thus, S increases. Conversely, if locality is low, the value of S decreases. Thus, whether S is larger than a preset threshold is determined. Accordingly, whether a pixel is a background or an object can be determined.

Such processing is performed on all pixels. Then, a set of an object portion determined in pixels is determined (step S105). For this purpose, for example, the method of labeling may be used. The pixel set determined here is set as an object area and information such as the position and size thereof is output as object information (step S106).

<2. Second Embodiment>

Next, the image processing apparatus according to the second embodiment of the present invention will be described. The configuration of the image processing apparatus according to the second embodiment is the same as that of the image processing apparatus according to the first embodiment described using FIG. 1 and thus, a detailed description thereof is omitted.

Figure 10:
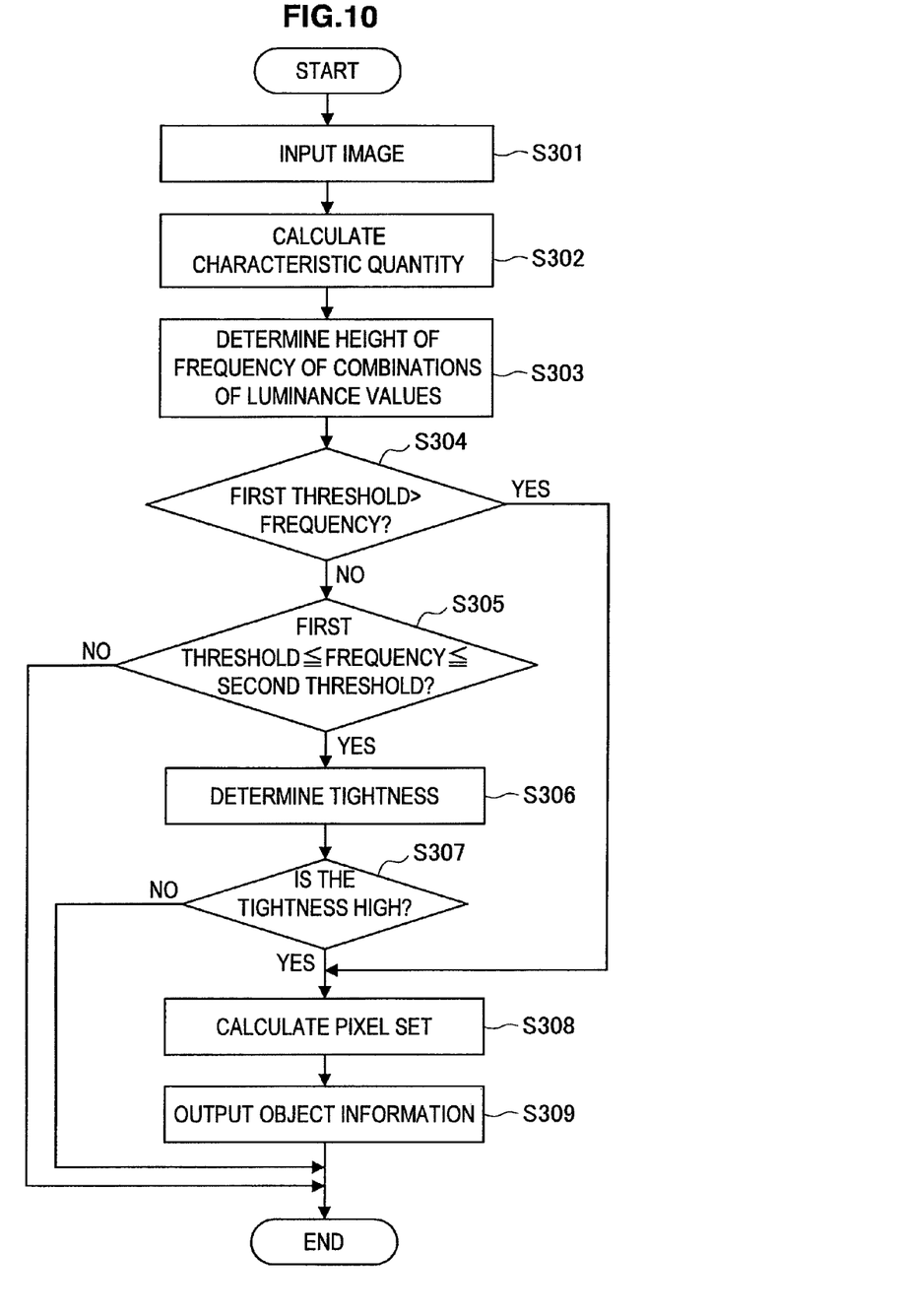
FIG. 10 is a flow chart showing the operation of an image processing apparatus 100 according to a second embodiment of the present invention.

The operation of the image processing apparatus according to the present embodiment will be described. FIG. 10 is a flow chart showing the operation of the image processing apparatus 100 according to the present embodiment.

First, image data is input from the image pickup camera 10 (step S301). Next, the image data is input into the characteristic quantity calculation unit 120 after temporarily being saved in the image saving unit 110. Then, the characteristic quantity calculation unit 120 calculates a characteristic quantity of a whole image of the input image or an area of a portion of the image specified in advance (step S302). In the present embodiment, for example, like the first embodiment, a simultaneous occurrence probability matrix is used as a characteristic quantity.

After the characteristic quantity, for example, a simultaneous occurrence probability matrix being determined, the tightness determination unit 130 determines a height of the frequency of combinations of luminance values (step S303). Then, detection processing of object is changed in accordance with the result thereof. In the first embodiment, whether an object is present is determined using tightness of pixels plotted based on the simultaneous occurrence probability matrix. However, if processing in the first embodiment is performed on all pixels, the processing time will be long. Thus, threshold processing in two stages will be used.

First, two thresholds are set for a simultaneous occurrence probability matrix. The first threshold is used to select pixels whose value is clearly low, that is, pixels considered to be an object, instead of a background. Next, regarding the second threshold, if the value is equal to or lower than the second threshold, determination processing whether the concerned pixels are an object or background is performed by a tightness determination like in the first embodiment. If the value exceeds the second threshold, the concerned pixels are determined to be a background without making a tightness determination. The first threshold is set lower than the second threshold.

That is, first, whether the concerned pixels are clearly not a background is determined because the frequency of combinations of luminance values is smaller than the first threshold (step S304). If the frequency of combinations of luminance values is smaller than the first threshold and the concerned pixels are determined to be an object, instead of a background, processing moves to step S308.

Then, whether the frequency of combinations of luminance values is equal to or greater than the first threshold and further equal to or smaller than the second threshold is determined (step S305). If the frequency of combinations of luminance values is equal to or greater than the first threshold and equal to or smaller than the second threshold, it is difficult to determine whether the concerned pixels are a background or object. In such a case, determination processing whether the concerned pixels are an object or background is performed by a tightness determination like in the first embodiment (step S306).

Then, if a determination is made at step S304 that the frequency of combinations of luminance values is smaller than the first threshold or at step S306 that tightness is high for combinations of certain luminance values (step S307), the concerned pixels are determined to be an object entering the image. In this case, all pixels having combinations of the luminance values are plotted on an image to calculate a pixel set using the method of labeling or the like (step S308). The pixel set determined here is assumed as an object area and information such as the position and size thereof is output as object information (step S309).

On the other hand, if the frequency of combinations of luminance values exceeds the second threshold at step S305, the concerned pixels are determined to be a background without making a tightness determination and processing is terminated under the assumption that no object has been detected. Also when a determination is made at step 307 that tightness is low, the concerned pixels are determined to be a background and processing is terminated under the assumption that no object has been detected.

According to the first embodiment and the second embodiment of the present invention, as described above, object detection processing in which a detection omission rarely occurs from an image can be performed by determining tightness of the image using a simultaneous occurrence probability matrix, which is a characteristic quantity of the image. Moreover, an effect of reducing erroneous detection of a partial area such as the horizon and a boundary of cloud can be achieved.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-123412 filed in the Japan Patent Office on May 21, 2009, the entire content of which is hereby incorporated by reference.

What is claimed is:

1. An image processing apparatus, comprising:
   a characteristic quantity calculation unit that calculates a characteristic quantity for each pixel of image data from the image data;
   a tightness determination unit that determines tightness indicating a degree of dispersion of pixels in image data for tightness determination by extracting the pixels having a same characteristic quantity by using the characteristic quantity and generating the image data for tightness determination composed of the pixels having the same characteristic quantity to determine whether each pixel of an image is one of a background and an object entering the image; and
   a pixel set calculation unit that calculates a set of the pixels of the object entering the image from the pixels in the image data for tightness determination in accordance with a determination of the tightness,
   wherein the tightness determination unit calculates, for the whole image, the tightness throughout an image of the pixels in the whole image data for tightness determination and, for each pixel, local tightness of the pixels in the image data for tightness determination, compares the tightness throughout the image and the local tightness to determine whether the pixels in the image data for tightness determination are distributed throughout the image data or crowded in a portion of the image data, and if the pixels in the image data for tightness determination are determined to be crowded only in the portion of the image data, the pixel set calculation unit calculates a set of the pixels in the image data for tightness determination.

2. The image processing apparatus according to claim 1, wherein the characteristic quantity is a simultaneous occurrence probability matrix based on a frequency of combinations of luminance values of two different pixels.

3. The image processing apparatus according to claim 1, wherein the tightness determination unit calculates variances of positions of the pixels in the image data for tightness determination and determines whether the pixels in the image data for tightness determination are distributed throughout the image data or crowded only in a portion of the image data based on the variances of positions and if the pixels in the image data for lightness determination are determined to be crowded in the portion of the image data, the pixel set calculation unit calculates a set of the pixels in the image data for tightness determination.

4. The image processing apparatus according to claim 2, wherein if the frequency of combinations of luminance values of two different pixels is between two thresholds, the tightness determination unit determines the tightness indicating the degree of dispersion of the pixels in the image data for tightness determination.

5. Art image processing method, comprising the steps of:

calculating a characteristic quantity for each pixel of image data from the image data by a characteristic quantity calculation unit;

determining tightness indicating a degree of dispersion of pixels in image data for tightness determination by extracting the pixels having a same characteristic quantity by using the characteristic quantity and generating the image data for tightness determination composed of the pixels having the same characteristic quantity by a tightness determination unit to determine whether each pixel of an image is one of a background and an object entering the image; and calculating a set of the pixels of the object entering the image from the pixels in the image data for tightness determination in accordance with a determination of the tightness by a pixel set calculation unit, wherein the tightness determination step calculates, for the whole image, the tightness throughout an image of the pixels in the whole image data for tightness determination and, for each pixel, local tightness of the pixels in the image data for tightness determination, compares the tightness throughout the image and the local tightness to determine whether the pixels in the image data for tightness determination are distributed throughout the image data or crowded in a portion of the image data, and if the pixels in the image data for tightness determination are determined to be crowded only in the portion of the image data, the pixel set calculation step calculates a set of the pixels in the image data for tightness determination.

6. A program, embodied on a non-transitory computer readable medium, for causing a computer to execute:

a procedure for calculating a characteristic quantity for each pixel of image data from the image data by a characteristic quantity calculation unit;

a procedure for determining tightness indicating a degree of dispersion of pixels in image data for tightness determination by extracting the pixels having a same characteristic quantity by using the characteristic quantity and generating the image data for tightness determination composed of the pixels having the same characteristic quantity by a tightness determination unit to determine whether each pixel of an image is one of a background and an object entering the image; and a procedure for calculating a set of the pixels of the object entering the image from the pixels in the image data for tightness determination in accordance with a determination of the tightness by a pixel set calculation unit, wherein the tightness determination procedure calculates, for the whole image, the tightness throughout an image of the pixels in the whole image data for tightness determination and, for each pixel, local tightness of the pixels in the image data for tightness determination, compares the tightness throughout the image and the local tightness to determine whether the pixels in the image data for tightness determination are distributed throughout the image data or crowded in a portion of the image data, and if the pixels in the image data for tightness determination are determined to be crowded only in the portion of the image data, the pixel set calculation procedure calculates a set of the pixels in the image data for tightness determination.

* * * * *